Patented Aug. 29, 1939

2,170,863

UNITED STATES PATENT OFFICE 2,170,863

PROCESS FOR MELTING UP LIGHT METAL SCRAP

Erich Junker, Berlin-Charlottenburg, and Willibald Leitgebel, Berlin-Wilmersdorf, Germany No Drawing. Application June 2, 1937, Serial No. 146,006. In Germany June 6, 1936

4 Claims. (Cl. 75—65)

This invention relates to a process for melting up the scrap from light metals. The large surface presented by the particles of scrap results in a serious loss of metal by burning during the melting up. To reduce this loss, different artifices are known, for example, feeding the scrap into molten light metal, or covering the molten metal with a salt layer, or melting up scrap mixed with a flux or feeding the scrap into a body of fused salt. Hitherto, for melting up the light metal scrap sodium chloride was often used whose melting point is about 800° C. or a still higher melting mixture of sodium chloride and calcium fluoride. Also, there has been employed for this purpose cryolite molten at about 977°, so that one can say that temperatures of 800–1,000° C. are usual in melting up light metal scrap.

The invention has for its object to reduce to a minimum the loss of metal by burning in the melting up of light metal scrap, and also to prevent changes in composition of light metal alloys in melting up the scrap through burning or slagging of the individual alloy components. This is secured, according to the invention, by melting up the light metal scrap at temperatures below 700° C.

For melting up pure aluminium shavings, turnings or the like, from magnesium scrap, temperatures of about 650–690° C. are employed. As is known, the melting point of pure aluminium is about 658° C., and the melting points of magnesium about 633° C. If, according to the invention, fusing temperatures of about 650–690° C. are employed for these metals, the temperature of the melt is only a little above the melting point of the metal, and the loss through burning, reaction and evaporation is reduced to a minimum. With light metal alloys, temperatures of 520–650° are employed in the invention, according to the composition and melting point of the alloys, as these ordinarily have lower melting points than the pure light metals. For example, the lower melting point of duralumin is only 525° C. However, it does not matter with these alloys if the fusion temperature is somewhat higher, even as with the pure metals. It matters in general less that the melting point is only a little above the melting point of the metals, but more that the fusion temperature does not exceed a certain upper limit which is, however, substantially lower than the fusion temperatures hitherto used in the melting up of light metal scrap.

The fusion temperatures in the range of 650–690° C. and in the range of 520–650° C. can, according to the invention, be, for example, secured and maintained by employing salt mixtures of alkali, alkaline earth or earth metal salts free from heavy metals whose fusion temperature lies in the range of 500–700°. Mixtures of the following salts have been successful:

Sodium chloride
Potassium chloride
Cryolite
Sodium fluoride
Barium chloride
Aluminium chloride
Aluminium fluoride Salt mixtures which react chemically with the light metal to be melted up from easily volatile or hygroscopic salts, e. g., zinc chloride, are to be avoided in the salt mixtures.

As examples of suitable compositions of salt mixtures, the following can be mentioned:

(1).                                      Percent
NaCl _____ 30–45
NaF _____ 5–20
KCl _____ Remainder Melting point: 600–680°.

(2).                                      Percent
NaCl (about) _____ 45
NaF _____ 5–10
KCl _____ 35–44
AlCl₃ _____ 6–10

Melting point: 580–620°.

(3).                                      Percent
NaCl (about) _____ 40
NaF _____ 4–10
KCl _____ 34–51
AlF₃ _____ 5–16

Melting point: 590–610°.

(4).                                      Percent
NaCl _____ 60–70
NaF _____ 5–10
Cryolite _____ 6–10
BaCl₂ _____ 14–25

Melting point: 550–625°.

(5).                                      Percent
NaCl _____ 55–65
Cryolite _____ 20–30
BaCl₂ _____ 5–25

Melting point: 630–720°.

For coarse and only slightly oxidized scrap, for example, coarse shavings, mixtures 1—3 are most preferable; for fine and strongly oxidized scrap, for example, wire, the salt mixtures 4 and 5.

By varying the composition of the salt mixtures, those of any desired fusion temperature within the range of 500–700° C. can be produced, whereby the light metal scrap can be melted at a temperature between 10° and 50° Celsius above its melting point.

In the practical carrying out of the invention, light metal scrap dry but still contaminated with oil either loose or in pieces, for example, pressed into briquettes, is treated with a solvent, for example, sprayed with benzine or carbon-tetra-chloride or dipped in such solvent. After this, the scrap is slightly warmed to free it from the residue of the solvent. The contaminated solvent can be regenerated.

For the fusion, an iron furnace can be used, which may be either uncoated or may have a coating of magnesite, sintered corundum, spinel, or the like. For the melting up of low melting alloys, where temperatures of about 520–650° C. are employed, an unlined furnace is preferably used. It has been shown that at these temperatures no attack of the iron takes place.

A construction of furnace has proved particularly suitable after the type of the known galvanizing furnace, in which the molten bath is so separated by a dividing wall that above the metal bath on one side of the separating wall there is the fusion salt, while on the other side of the wall the plain metal surface is exposed. The scrap is fed in that side of the wall on which there is the fused salt.

The invention can, however, be so carried out that the light metal scrap fed in from the top is melted at the lowest possible temperature, for example, immersed in a bath of metal already present whose temperature is only slightly above the melting point of any of the metals or of any of the alloys, for example, in the above-named ranges of 520–650° or 650–690°. For this purpose, crucibles or ovens of ceramic material can be employed. The molten metal is then treated with salt mixtures of the above-named composition, and purified.

The advantage of the new process consists mainly in that there results only a very small loss by burning, the composition of the metals or alloys is not, or is not noticeably, altered by the melting up, a pure block metal is obtained, and there results no attack on the crucible or furnace material through the melting.

We declare that what we claim is:

1. A process which comprises melting up light metal scrap at a temperature below 690° C. in the presence of a flux consisting of a mixture of at least three different salts comprising sodium chloride, cryolite, and barium chloride, said salts being so proportioned as to melt between 520 and 690° C.

2. A process which comprises degreasing light metal scrap with the aid of a solvent, drying it, introducing the clean scrap in a bath of molten light metal underneath a layer of a non-hygroscopic mixture of fused salts comprising sodium chloride, sodium fluoride and postassium chloride, and causing said scrap to melt in said bath, said salt mixture comprising at least three different alkali halides having a melting point of between 500 and 700° Celsius, and being free of heavy metal salts and of salts reacting with the metal, said bath having a temperature between 10 and 50° Celsius above the melting point of said scrap.

3. A process which comprises degreasing light metal scrap with the aid of a solvent, drying it, introducing the cleaned scrap in a bath of molten light metal underneath a layer of a non-hygroscopic mixture of fused salts, and causing said scrap to melt in said bath, said salt mixture comprising sodium chloride, sodium fluoride, a third alkali halide and a fourth salt selected from among the alkaline earth metal and earth metal salts, and being free of heavy metal salts and of salts reacting with the metal, said bath having a temperature between 10 and 50° Celsius above the melting point of said scrap.

4. A process as claimed in claim 3 in which said mixture comprises sodium chloride, sodium fluoride, potassium chloride, and an aluminum halide.

ERICH JUNKER.
WILLIBALD LEITGEBEL.